UNITED STATES PATENT OFFICE 2,100,297

SOLUBILIZED HIGHER ALIPHATIC SULPHIDES AND PROCESS FOR THEIR PRODUCTION

Alfred William Baldwin and Henry Alfred Piggott, Blackley, Manchester, England, assignors to Imperial Chemical Industries Limited, a corporation of Great Britain No Drawing. Application February 27, 1935, Serial No. 8,553. In Great Britain March 12, 1934

14 Claims. (Cl. 260—99.12)

This invention relates to the manufacture of new substances having properties that make them valuable as wetting, cleansing and emulsifying agents.

This invention has as an object the preparation of new and useful chemical compounds. A further object resides in devising novel procedures whereby these new chemical compounds may be obtained. A still further object lies in the use of these new chemical compounds in novel technical applications. Other objects will appear hereinafter.

These objects are accomplished by the following invention wherein new compounds having the general formula A—S—R—SO$_4$M in which A represents an aliphatic group containing a chain of eight or more carbon atoms, R stands for an aliphatic group, and M stands for hydrogen or a soluble salt-forming group. In the preferred embodiment of the invention, A stands for an alkyl group containing from ten to thirty carbon atoms, R stands for a short chain (two to six carbon atoms) aliphatic hydrocarbon group, and M stands for an alkali metal.

The invention is illustrated but not limited by the following example in which the parts are by weight.

Example 10 parts of cetyl mercaptan are dissolved in 70 parts of methyl alcohol containing 2 parts of sodium methoxide; 3.1 parts of ethylene chlorohydrin are then added and the mixture is boiled under a reflux condenser for 2 hours. It is then filtered from precipitated sodium chloride. The filtrate is concentrated by evaporation. On cooling 2-hydroxy-ethyl cetyl sulphide separates. This may be purified still further, if desired, by recrystallization from a mixture of acetone and methyl alcohol.

10 parts of the sulphide so obtained, 7.5 parts of sodium pyrosulphate and 2.7 parts of pyridine are stirred at 90–95° C. until a sample dissolves in water to a clear foaming solution. The reaction mixture is stirred into 40 parts of water, 10 parts of sodium chloride are added and, after stirring several hours to complete the precipitation, the product is filtered off. A white pasty solid is obtained. This dissolves readily in hot water to yield clear solutions with excellent foaming and detergent properties. If desired the pasty solid may be dried. The compound may after drying be freed from inorganic salts by extraction with methyl alcohol.

In place of using cetyl mercaptan to prepare the new compounds comprehended by the present invention, use may be made of any aliphatic mercaptan containing a chain of eight or more carbon atoms. As examples of other mercaptans which may be used in preparing these new compounds, mention should be made of the octyl, decyl, undecyl, dodecyl, tetradecyl, pentadecyl, octadecyl, eikosyl, ceryl, melissyl, oleyl, linoleyl, erucyl, and ricinoleyl mercaptans. In place of using any one of the aforementioned mercaptans, use may be made of desired mixtures thereof. The use of a mixture of octyl, decyl, dodecyl, tetradecyl, and hexadecyl mercaptans is frequently to be preferred since a cheap mixture of these mercaptans is obtained when the mixture of alcohols obtained from the hydrogenation of coconut oil is used as raw material in the preparation of these mercaptans.

Those compounds which come within the scope of the present invention and in which R represents an aliphatic hydrocarbon group attached to an SO$_4$M group are prepared by a general method which has been illustrated above in the example. In place of using ethylene chlorohydrin to prepare these compounds, it is also feasible to use a number of other halohydrins. Other halohydrins which may be employed in the synthesis of some of the new compounds comprehended by the present invention are: ethylene bromohydrin, propylene bromohydrin, glyceryl alpha monochlorohydrin, glyceryl beta monochlorohydrin, glyceryl di-chlorohydrin, the corresponding glyceryl bromohydrins. The hydroxy di-alkyl sulphides used in preparing the compounds of the present invention may be prepared by the method set forth in Examples 6 and 7 of U. S. Patent No. 1,987,526 in place of following the general procedure given in the example of the present specification. The following hydroxy di-alkyl sulphides may be sulphated to obtain compounds coming within the scope of the present invention: 2-hydroxy-ethyl decyl sulphide, 2-hydroxy-ethyl dodecyl sulphide, 2-hydroxy-ethyl tetradecyl sulphide, 2-hydroxy-ethyl hexadecyl sulphide, 2-hydroxy-ethyl octadecyl sulphide, di-hydroxy propyl dodecyl sulphide, di-hydroxy propyl hexadecyl sulphide, and the compound made by reacting two mols of cetyl mercaptan with one mol. of glyceryl di-chlorohydrin. In employing these halohydrins to prepare the compounds of the present invention, the synthesis is so governed that each of the halogen atoms of the halohydrin is replaced by an alkyl mercaptan group, and each of the hydroxy groups of the halohydrin is converted to an OSO$_3$M group. In view of their cheapness, ethylene chlorohydrin and glyceryl alpha mono chlorohydrin are preferred for making compounds such as that given in the example.

In the compounds of the present invention, M will usually stand for hydrogen or an alkali metal. However, ammonia, methyl amine, butyl amine, cyclohexyl amine, mono-, di-, or tri-ethanol amine, piperidine, morpholine, or other water soluble organic bases may be used to neutralize the acid hydrogen of the compounds of the present invention.

Some compounds which may be prepared and which come within the scope of this invention are: sodium dodecyl mercapto ethyl acid sulphate; sodium tetradecyl mercapto ethyl acid sulphate; sodium hexadecyl mercapto ethyl acid sulphate; sodium octadecyl mercapto ethyl acid sulphate; sodium dodecyl mercapto propyl di-acid sulphate; sodium hexadecyl mercapto propyl di-acid sulphate; and sodium octadecyl mercapto propyl di-acid sulphate.

The new compounds covered in this case are useful generally wherever known wetting, detergent, and emulsifying agents have heretofore been used. They may be used by themselves or in combination with known wetting or detergent agents in those relations in which soap and soap-like products have previously been used. These compounds can be used in wool-washing or carbonizing baths. They are very useful in any textile treatment bath in which it is desirable to secure a thorough wetting of the textile material by the liquid of the treating bath. These compounds are useful addition agents to dye baths since they enable the dye to thoroughly wet the material to be dyed. They are also useful in leather-soaking, deliming and bating liquors. They may be used as modifying agents in ore flotation processes and as emulsifiers for oils and bitumens. They may also be used to stabilize natural or synthetic emulsions or dispersions such as rubber latex, wax emulsions, and pharmaceutical emulsions. Another important application of these substances arises from their ability to inhibit the precipitation of ordinary soap in hard and acid waters. This property makes it possible to obtain a cheap detergent which is resistant to hard and acid waters by mixing small quantities of these substances with ordinary soap.

As many apparently widely different embodiments of this invention may be made without widely departing from the spirit and scope thereof, it is to be understood that the invention is not limited to the specific embodiments thereof except as defined in the appended claims.

We claim:

1. New chemical compounds having the general formula $$C_{16}H_{33}-S-CH_2-CH_2-SO_4M$$

in which M stands for an alkali metal.

2. A new chemical compound having the formula $$C_{16}H_{33}-S-CH_2-CH_2-OSO_3Na$$

3. The process of making compounds having the general formula $$A-S-R(SO_4M)_{1\ or\ 2}$$

in which A represents an alkyl group having a chain containing eight or more carbon atoms, R represents an aliphatic hydrocarbon group, and M represents hydrogen or an alkali metal, which comprises sulphating compounds having the general formula $A-S-R(OH)_{1\ or\ 2}$.

4. The process of making compounds having the general formula $$A-S-CH_2-CH_2SO_4M$$

in which A represents an alkyl group containing from twelve to eighteen carbon atoms, and M represents hydrogen or an alkali metal, which comprises sulphating compounds having the general formula $A-S-CH_2-CH_2-OH$.

5. The process of making the compound having the formula $$C_{16}H_{33}-S-CH_2-CH_2-OSO_3Na$$

which comprises stirring 10 parts of 2 hydroxyethyl cetyl sulphide, 7.5 parts of sodium pyrosulphate, and 2.7 parts of pyridine at 90–95° C. until a sample dissolves in water to a clear foaming solution, stirring the reaction mixture into 40 parts of water, adding 10 parts of sodium chloride, completing the precipitation by stirring for several hours, and filtering.

6. New chemical compounds having the general formula:

$$A-S-R-SO_4M$$

in which A represents an aliphatic group containing a chain of eight or more carbon atoms, R stands for an aliphatic hydrocarbon group, and M stands for hydrogen or a soluble salt-forming group.

7. A process of making the compounds defined in claim 6 which comprises sulphating each hydroxyl group in the compounds having the general formula:

$$A-S-R(OH)_{1\ or\ 2}$$

wherein A and R have the significance set forth in claim 6, by the use of an alkali metal pyrosulphate along with pyridine.

8. New chemical compounds having the general formula:

$$A-S-R(SO_4M)_{1\ or\ 2}$$

in which A represents an alkyl group containing a chain of from ten to thirty carbon atoms, R stands for a saturated aliphatic hydrocarbon group containing from two to six carbon atoms, and M stands for hydrogen or a soluble salt-forming group.

9. A process of making the compounds defined in claim 8 which comprises sulphating each hydroxyl group in the compounds having the general formula:

$$A-S-R(OH)_{1\ or\ 2}$$

wherein A and R have the significance set forth in claim 8, by the use of an alkali metal pyrosulphate along with pyridine.

10. New chemical compounds having the general formula:

$$A-S-CH_2-CH_2-SO_4M$$

in which A represents an alkyl group containing a chain having from ten to thirty carbon atoms, and M stands for an alkali metal.

11. A process of making the compounds defined in claim 10 which comprises sulphating compounds having the general formula:

$$A-S-CH_2-CH_2OH$$

wherein A has the significance set forth in claim 10, by the use of an alkali metal pyrosulphate along with pyridine.

12. Sulphuric acid esters of compounds having the general formula:

$$A-S-CH_2-CHOH-CH_2OH$$

wherein each hydroxyl group is esterified and wherein A represents an aliphatic group containing a chain of eight or more carbon atoms.

13. Alkali metal salts of sulphuric acid esters of compounds having the general formula:

$$A-S-CH_2-CHOH-CH_2OH$$

wherein each hydroxyl group is esterified and wherein A represents an alkyl group containing a straight chain of from ten to thirty carbon atoms.

14. An alkali metal salt of a sulphuric acid ester of a compound having the formula:

$$C_{16}H_{33}-S-CH_2-CHOH-CH_2OH$$

wherein each hydroxyl group is esterified.

ALFRED WILLIAM BALDWIN.
HENRY ALFRED PIGGOTT.